April 7, 1953  H. STOERTZ  2,634,304
STORAGE BATTERY GRID
Filed Aug. 19, 1950
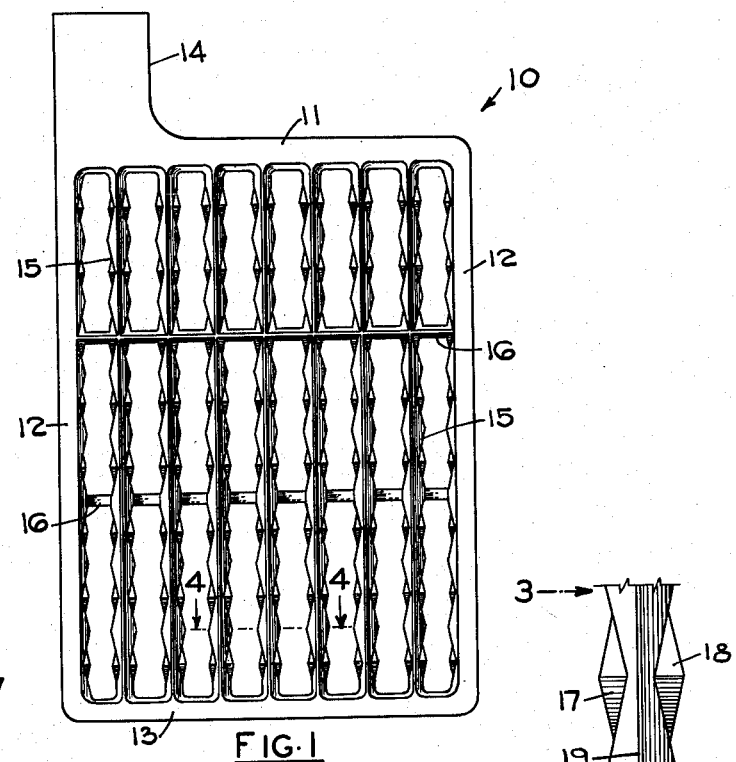
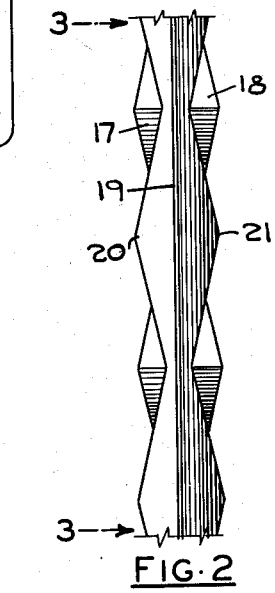
INVENTOR
HOWARD STOERTZ
BY
Edward J. Dwyer
ATTORNEY Patented Apr. 7, 1953

2,634,304

UNITED STATES PATENT OFFICE 2,634,304

STORAGE BATTERY GRID

Howard Stoertz, Philadelphia, Pa., assignor to The Electric Storage Battery Company, a corporation of New Jersey Application August 19, 1950, Serial No. 180,345

3 Claims. (Cl. 136—39)

The invention relates to storage batteries and, more particularly, to the grid used in flat, pasted storage battery electrodes or plates and to which the active material is applied.

The conventional storage battery grid consists generally of a plurality of horizontal bars intersecting at spaced locations with a plurality of vertical bars, the whole being tied together by an integral frame. By reason of this construction and regardless of the manner in which the casting is done, it has hitherto been difficult to produce grids without high scrap loss due to inability properly to fill the mold cavities wherein the horizontal bars are produced. Furthermore, hidden defects thus produced in the grids contribute to grid failure resulting in short battery life in service, especially cycle service.

In spite of these facts, however, it has heretofore been felt that the horizontal bars are necessarily present by reason of a substantial part taken in the electrical conductivity of the grid and in the retention of active material. Contrary to this conventional practice, it has now been determined that horizontal bars can be eliminated with the exception of a few such bars, relatively small as compared with the vertical bars, retained merely to provide rigidity in handling and pasting, that conductivity is not affected by the elimination of a substantial number of the horizontal bars and that the active material can be retained in the plate by other means.

Furthermore, in the conventional grid, there can often be found porous metal at the juncture points of the vertical bars and horizontal bars reflecting shrinkage stresses set up in the metal during cooling, such porous metal providing a ready point of attack for electrolytic corrosion. By making the horizontal bars few in number and relatively small in size, these stresses with the consequent formation of porous metal are, to a large extent, eliminated. Accordingly, my invention enables me not only to attain the advantages of the use of horizontal bars without the disadvantages thereof but also provides certain advantages that are not attained by the use of the conventional construction.

It is, therefore, an object of the invention to provide a storage battery grid for use in the pasted type of plate that can be cast with greater facility and success than those common in the art.

An additional object of the invention is to provide a storage battery grid including certain novel structural features enhancing the ability of the grid to retain the active material in the plate.

A further object of the invention is to provide a storage battery grid having such improved electrical conductivity and resistance to electrolytic corrosion as to provide a more efficient and long life plate.

In the drawing, like members are used to indicate like parts.

Figure 1 is an elevational view of a storage battery grid in accordance with my invention.

Figure 2 is an elevational view of an enlarged portion of one of the vertical bars designated as in Figure 1.

Figure 3 is a view taken along the line 3—3 in Figure 2.

Figure 4 is an enlarged sectional view taken along the line 4—4 in Figure 1.

Referring now to the drawing, particularly Figure 1, there is shown a storage battery grid indicated generally at 10, grid 10 comprising a frame having a top bar 11, side bars 12, and a bottom bar 13. A lug 14 of the conventional type is formed integrally with or otherwise suitably connected to top bar 11.

Extending from top bar 11 to bottom bar 13 are a plurality of vertical bars 15 intersected at intervals by a relatively small number of horizontal bars 16, serving only to provide a degree of rigidity to the grid 10. Horizontal bars 16 are preferably cast with a substantially smaller cross-section than vertical bars 15.

Vertical bars 15 are preferably of a diamond shaped cross section as shown in Figure 4 and are provided with pairs of pyramidal projections 17 and 18 projecting forwardly of the minor axis of a vertical bar, projection 17 being on one side of acute angle 19 of a vertical bar and projection 18 being in a corresponding position on the other side of said acute angle. Vertical bars 15 are further provided with pairs of pyramidal projections 20 and 21 respectively, projecting rearwardly of the minor axis of a vertical bar, projection 20 being on one side of acute angle 22 of the vertical bar and projection 21 being in a corresponding position on the other side of said acute angle.

It will be understood that the arrangement of pyramidal shaped projections 17, 18, 20 and 21, as described above, is preferably repeated in an identical manner on each vertical bar of the grid. Accordingly, as best shown in Figure 4, the novel construction of said projections serves to lock the active material in place within the grid structure and, by this means, provides a plate of sufficient mechanical strength to withstand various handling and processing operations during manufacture.

Another advantage of the invention is readily discernible. Storage battery grids are conventionally cast of a lead-antimony alloy, the latter metal providing certain stiffening properties which is lacking in pure lead. During the life of the battery, however, the antimony has a tendency to leach out of the positive grid and become deposited on the negative plate thereby promoting local action and consequent self-discharge of the negative plate. As shown in Figures 3 and 4, projections 17 and 20 are so designed as to project only to a point inwardly of the apex of acute angles 19 and 22 of a diamond shaped vertical bar 15. Since such projections will, as a result of such construction, at all times be below the surface of the active material pasted into the grid, a minimum amount of grid metal will be exposed to contact with the electrolyte thus substantially reducing transfer of antimony to the negative plate and keeping local action and self-discharge at a minimum value. It will, of course, be understood that projections 18 and 21, shown in Figure 4, are likewise so constructed and arranged. Furthermore, although horizontal bars 16 have been shown (Figure 1) as being on the opposite surfaces of the grid they may, of course, be so constructed as to intersect vertical bars 15 at the obtuse angles 23 thereof in order also to remove such bars from the surface of the plate.

It will be seen, therefore, that the objects of the invention, namely to provide a readily castable grid that will have increased efficiency in the retention of active material and improved electrical conductivity and corrosion resistance, have been achieved.

While there has hereinbefore been disclosed a certain embodiment of the invention, other forms and variations thereof will be readily apparent to those skilled in the art. It is not intended, therefore, to be limited to any such specific disclosure but only by the scope of the claims appended hereto.

I claim:

1. A storage battery grid, comprising a plurality of intersecting horizontal bars and vertical bars, said vertical bars being of a diamond shaped cross-section, and a plurality of pyramidal shaped active material retaining means projecting from each facet of said vertical bars between each intersection with said horizontal bars, one face of each of said retaining means being an extension of the facet adjoining said retaining means carrying facet at the minor axis of said vertical bar.

2. A storage battery grid, comprising a plurality of intersecting horizontal bars and vertical bars, said vertical bars being of a diamond shaped cross-section, and a plurality of pyramidal shaped active material retaining means formed thereon between each said intersection, said means being arranged by pairs, one member of each pair being on opposite sides of the major axis of said vertical bars, one face of each of said retaining means being an extension of the facet adjoining said retaining means carrying facet at the minor axis of said vertical bar.

3. A storage battery grid, comprising a plurality of intersecting horizontal bars and vertical bars, said vertical bars being of a diamond shaped cross-section, and a plurality of pyramidal shaped active material retaining means formed thereon between each said intersection, said means being arranged by pairs, the members of each pair being on opposite sides of the major axis of said vertical bars and alternate pairs projecting respectively forwardly and rearwardly of the minor axis of said vertical bars, one face of each of said retaining means being an extension of the facet adjoining said retaining means carrying facet at the minor axis of said vertical bar.

HOWARD STOERTZ.

REFERENCES CITED

The following references are of record in the file of this patent:

UNITED STATES PATENTS

| Number | Name | Date |
|---|---|---|
| 677,244 | Madden | June 25, 1901 |

FOREIGN PATENTS

| Number | Country | Date |
|---|---|---|
| 29,273 | Great Britain | Jan. 22, 1898 |